United States Patent Office 2,844,592
Patented July 22, 1958

2,844,592

PREPARATION OF CONVERSION PRODUCTS OF PENTAERYTHRITE DICHLOROHYDRINE MONOSULFUROUS ACID ESTERS

Helmut Pietsch and Horstmar Nagel, Dusseldorf, Germany, assignors to Henkel & Cie. G. m. b. H., Dusseldorf-Holthausen, Germany, a corporation of Germany No Drawing. Application July 8, 1952
Serial No. 297,982

Claims priority, application Germany July 20, 1951

14 Claims. (Cl. 260—333)

This invention relates to improvements in the preparation of conversion products of pentaerythrite dichlorohydrine monosulfurous acid esters.

In U. S. patent application Ser. No. 285,311 of Helmut Pietsch, filed April 30, 1951, now U. S. Patent 2,708,198, pentaerythrite dichlorohydrine monosulfurous acid esters and a process for the production thereof are described. In accordance with the said application, thionyl chloride and pentaerythrite are reacted in the presence of pyridine and pentaerythrite dichlorohydrine monosulfurous acid ester is recovered from the reaction mix. This monosulfurous acid ester is believed to have the following structural formula:

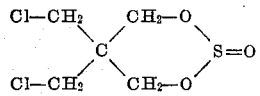

and will be referred to throughout the specification as the p-d sulfurous acid ester for the sake of brevity.

It is an object of this invention to obtain valuable conversion products from the p-d sulfurous acid ester.

The p-d sulfurous acid ester may be produced by reacting thionyl chloride with pentaerythrite in the presence of pyridine, as, for example, in accordance with the aforementioned U. S. patent application Ser. No. 285,311. The applicants have found that the formation of the ester is promoted if small amounts of pyridine are used, and if the reaction mixture is heated to not too high a temperature, for example, only to temperatures in the range of about 100° C. For the formation of the p-d sulfurous acid ester, theoretically 3 mols of thionyl chloride per mol of pentaerythrite are necessary, and the use of a small excess of thionyl chloride is advantageous. In spite of this, however, the ester is also formed by the reaction with the use of smaller amounts of thionyl chloride and about 2 mols per mol of pentaerythrite, and can be isolated from such reaction mixtures. By correct choice of the working conditions, reaction products can be obtained in which the pentaerythrite is converted for the most part into the sulfurous acid ester.

If it is desired to isolate the sulfurous acid ester from the reaction mixture before saponification, this can be effected by utilizing those of its physical properties which differ from the other reaction products. The partial esterification products of pentaerythrite with hydrogen chloride are more or less easily soluble in water, while the sulfurous acid ester is practically insoluble in water. According to the ratio of the amounts of the different components of the reaction product, a separation into layers may not occur at first during addition of water to the reaction mixture, but may mostly occur with further addition of water. The boiling point of the sulfurous acid ester lies between those of the di- and tri-chlorohydrine. If the reaction products are to be separated from one another by distillation, it should be noted that under certain conditions displacements of the boiling point may occur, which is probably attributable to the formation of azeotropically boiling mixtures. In spite of this, it is not difficult to isolate the p-d sulfurous acid ester from the reaction mixture in a satisfactorily pure state, for example, by careful, and, if necessary, repeated, distillation. Moreover, it is possible to combine different separating operations with one another. Thus, for example, if the reaction product is washed with water, the pentaerythrite partial esters are removed from the reaction mixture, and simultaneously a large part of the pyridine which is present is washed out and the sulfurous acid ester can be isolated quite easily from the washed product by distillation, and, if necessary, caused to crystallize by further purification and seeding.

According to the present invention, valuable conversion products of the p-d sulfurous acid ester are obtained by reacting the acid ester with a saponifying (ester-splitting) agent. Suitable acids or acid-binding substances may be used as the saponifying agents. If necessary, these saponifying agents may be dissolved in water or in suitable organic solvents.

In the case of acid saponification, only the sulfurous acid ester compounds are dissolved, and there is produced pentaerythrite dichlorohydrine. When carrying out the process in practice, the ester can be heated together with aqueous solutions of strong acids, as hydrochloric acid or sulfuric acid. The reaction will already proceed at temperatures of 80–90° C. with such a velocity that heating to a higher temperature is not necessary. If recovery of the sulfur dioxide is desired, the reactions may be effected in closed vessels, and, if necessary, under pressure, and/or at other than the above-mentioned temperatures. It is possible to tell when reaction has ended, because then the evolution of sulfur dioxide ceases. The pentaerythrite dichlorohydrine produced is sufficiently pure for many purposes, but it can be obtained in still purer form by known purification process, such as distillation or crystallization.

Pentaerythrite dichlorohydrine can also be obtained when working with acid-binding agents. As acid-binding agents, alcoholic solutions of caustic alkalis are used. However, depending on the amount of the acid-binding agents, other conversion products of the sulfurous acid ester may also be formed. Thus, if about 2 equivalents of the acid-binding agent are used per mol of the p-d sulfurous acid ester, then the principal reaction product is pentaerythrite dichlorohydrine. If, however, the amount of acid-binding substance is increased to amount of 5 equivalents for one equivalent of the p-d sulfurous acid ester or more then halogen is split off to an increasing degree and cyclic compounds are produced which are believed to be inner ethers of pentaerythrite. The alcohols may also take part in the reaction, and form derivatives of the above-named products; the number of the compounds which may be prepared according to the process of the invention is thereby increased. The reaction starts when bringing together the reactants at normal temperatures. To complete the reaction, the mixture may be heated to temperatures of 60° C. and higher, up to the boiling point of the alcohol. The number of alcohols is only limited by the decreasing solubility of the caustic alkali with increasing chain length of the alcohol. Mixtures of solid caustic alkali with alcohols, containing up to 5 carbon atoms may be used.

The crude reaction product obtained by the reaction of pentaerythrite with thionyl chloride in the presence of pyridine, contains, in addition to the sulfurous acid ester, still other esters of pentaerythrite with inorganic acids, for example, pentaerythrite dichlorhydrine. It may therefore be preferable to saponify the crude reaction product, if necessary, after separation of pyridine, sulfur dioxide, and hydrogen chloride. Insofar as pentaerythrite dichlorohydrine is to be produced, the yield of this substance will be increased by the amount of dichlorohydrine in the raw reaction product. The esters formed from pentaerythrite and inorganic acids and which accompany the p-d sulfurous acid ester as side products, will yield, on treatment with acid-binding substances, products similar to the p-d sulfurous acid ester itself. Thus, if the process according to the invention is used for the conversion of the crude products obtained by the treatment of pentaerythrite with thionyl chloride in the presence of pyridine, the yield of the valuable conversion products obtained is considerably increased.

The pentaerythrite dichlorohydrine and the other substances prepared according to the process of the invention, are suitable as intermediates for organic synthesis or for making artificial resins.

By means of the process according to the invention, it has become possible to work up the p-d sulfurous ester which is produced as a by-product in the reaction of pentaerythrite with thionyl chloride in the presence of pyridine to pentaerythrite dichlorohydrine or other technically valuable products. Even if it is desired to make pentaerythrite dichlorohydrine as the main product, the production by first making the p-d sulfurous ester leads to higher yields than the direct synthesis from pentaerythrite and thionyl chloride. The manufacture of the p-d sulfurous ester gives a yield of about 71% (compare Example 2 below). On saponification of the ester, pentaerythrite dichlorohydrine is produce in 95% yield (compare Example 2 below). From a mol of pentaerythrite (136 g.) therefore, by this method there is obtained 115 g. of pentaerythrite dichlorohydrine. When producing pentaerythrite dichlorohydrine by reacting pentaerythrite with thionyl chloride in presence of pyridine according to the process, described in the first paragraph of Example 1, and using a molar ratio of the reactants 1:2:2, a best yield of only 70 g. per mol is obtained.

This invention will be more clearly understood by reference to the following examples which are given by way of illustration and not limitation:

Example 1

A mixture of 408 g. (3 mols) of pentaerythrite and 474 g. (6 mols) of pyridine is treated at first drop by drop, then more rapidly, with 1180 g. (10 mols) thionyl chloride. The reaction mixture is at first slowly heated and finally boiled at 150°–165° C. under reflux for 2 to 3 hours, until no more evolution of gas takes place. The cooled reaction product is mixed with the same volume of water, then shaken with benzene, and extracted for three days with ether. After combination of the benzene and ether extracts, the solvent is distilled off and the residue distilled in vacuo. After a first running of $BP_7 = 124$–$140°$ C. (30 g.), the only partially solidifying main running of $BP_5 = 140$–$155°$ C. passes over in an amount of 220 g.

On treatment with hot water, 60 g. of a non-solidifying oil remains which consists substantially of the monosulfurous ester of pentaerythrite dichlorohydrine. The raw product, after treatment with a little alcohol, is placed in a freezing mixture whereby the ester crystallizes out. After filtering the alcohol under suction, 58 g. of the crystalline ester are obtained.

22 g. of pentaerythrite dichlorohydrine monosulfurous acid ester are heated to boiling with a mixture of 5 ccs. of concentrated hydrochloric acid and 40 ccs. of water under a reflux condenser. After the evolution of sulfur dioxide has ceased, the mixture is treated with decolorizing carbon filtered, concentrated and crystallized. The crystals melt at 65°–70° C. and may be purified further, for example, as described in the following example.

Example 2

408 g. of pentaerythrite (3 mols) are mixed with 80 g. of pyridine, and, with cooling, treated first slowly, then rapidly, with 1180 g. (10 mols) of thionyl chloride. After standing over night, it is first heated for a few hours to about 40–60° C., then on the steam bath again for a few hours with occasional stirring. The oily yellowish-brown reaction product is washed by shaking with double the amount of water with gentle heating on the steam bath, separated, once again washed with cold water, and then distilled in vacuo. The sulfurous ester of pentaerythrite dichlorohydrine passes over as a heavy pale yellowish oil $BP_4 = 130$–$135°$ C. The end of the distillation can be detected by a sudden turbidity of the distillate and soon thereafter by a sudden rise of the boiling temperature. The product thus obtained may be purified still further, for example, by heating with decolorizing carbon on the steam bath, filtering, and again distilling in an efficient column. It passes over then at $BP_{4-5} = 113$–$115°$ C. On placing in a freezing mixture or on seeding, the ester crystallizes in the form of long needles having a melting point of 30° C. The yield of sulfurous acid ester after the second distillation amounts to about 400 g. (i. e. about 70–73% of the theoretical yield). By working up the first and last runnings of the two distillations, the yield may be still further improved.

200 g. of the crystallized pentaerythrite dichlorohydrine monosulfurous acid ester are heated with a mixture of 200 ccm. of water and 200 ccm. of concentrated hydrochloric acid in a porcelain dish on the steam bath. At about 85° C. a violent evolution of sulfur dioxide sets in, whereby a clear solution is produced. If one starts with impure ester, then the solution obtained shows a turbidity which may be removed by filtration. The solution is further concentrated, preferably at temperatures below 110° C., until a sample, on cooling, completely solidifies. The yield of dry pentaerythrite dichlorohydrine of M. P. 60–65° C. amounts to 150 g. (i. e. 95% of the theoretical yield). The substance can be recrystallized, using decolorizing carbon, and then melts at 83° C.

Example 3

22 g. (about 0.1 mol) of sulfurous acid ester of pentaerythrite dichlorohydrine are boiled under reflux condenser for 30 minutes with 100 ccm. of absolute alcohol in which 11.5 g. of KOH (about 0.2 mol) have been dissolved. After filtration of the precipitated mixture of salts and after the alcohol has been distilled off, pentaerythrite dichlorohydrine remains in almost theoretical yield.

Example 4

1225 g. of pentaerythrite (9 mols) are added to a mixture of 3540 g. of thionyl chloride (30 mols) and 240 g. of pyridine (3 mols) with stirring and cooling in the course of about two hours. After standing for some time with vigorous stirring, it is slowly brought to steam-bath temperature until no more evolution of gas can be observed. 250 g. of the pale brown, oily reaction product, which consists mainly of the monosulfurous acid ester of pentaerythrite dichlorohydrine, are treated slowly with cooling and shaking with 1000 cc. of alcoholic potash which contains 140 g. of KOH (about 2.5 mols). A copious mixture of salts is precipitated. After one hour of boiling on the water bath under a reflux condenser, it is filtered and distilled in vacuo.

After a first running containing alcohol and pyridine (up to 120° C./3 mm. Hg), there is collected the main amount of pentaerythrite dichlorohydrine between 130–150° C./3 mm. Hg which melts at 75–80° C. and is sufficiently pure for many technical purposes.

Example 5

22 g. (.1 mol) of sulfurous acid ester of pentaerythrite dichlorohydrine are mixed with a solution of 28 g. KOH (.5 mol) in 250 cc. of absolute alcohol and heated on the steam bath for one hour under a reflux condenser. It is filtered from the copiously precipitated mixture of salts, the alcohol, first at normal, then in a column under reduced pressure, is distilled off, and the residue once more filtered. In all, 31 g. of a salt mixture are deposited, which consists substantially of $K_2SO_3$ and KCl. The filtrate, when completely free from alcohol, is submitted to a vacuum sublimation whereby 3–4 g. of 3:6-di-oxaspiro-(3:3) heptane are obtained. A residue of 6–7 g. remains, in which still bound chlorine atoms, free hydroxyl groups, and ethoxy groups could be shown to be present, and which, in addition to other oxacyclobutane derivatives, contains the following compounds:

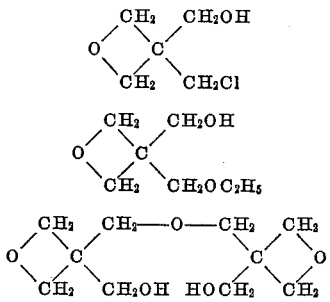

The compounds, the structural formulae of which are given above, are new compounds.

The same results were obtained when using 0.5 mol of NaOH or a little more instead of 0.5 mol KOH.

When performing the acid saponification, described in the last paragraph of the Example 1 with a mixture of 1 ccm. of concentrated sulfuric acid and 40 ccs. of water, the same results are obtained.

We claim:

1. Process for the preparation of conversion products of pentaerythrite dichlorohydrine monosulfurous acid ester, which comprises reacting pentaerythrite dichlorohydrine monosulfurous acid ester with a saponifying agent selected from the group consisting of HCl, $H_2SO_4$, KOH, and NaOH, and recovering the conversion products formed thereby.

2. Process according to claim 1, in which said pentaerythrite dichlorohydrine monosulfurous acid ester is reacted in the form of crude reaction product obtained by the reaction between pentaerythrite and thionyl chloride in the presence of 0.2–2 mols of pyridine for each mol of pentaerythrite.

3. Process for the production of pentaerythrite dichlorohydrine which comprises reacting one mol of pentaerythrite and at least three mols of thionyl chloride in the presence of 0.2–2 mols of pyridine for each mol of pentaerythrite, thereafter reacting the crude reaction product obtained with a saponifying agent selected from the group consisting of HCl, $H_2SO_4$, KOH and NaOH, and recovering pentaerythrite dichlorohydrine.

4. Process according to claim 3, in which said saponifying agent is HCl in the form of an aqueous solution said saponifying agent being present in amount of three equivalents for each mol of pentaerythrite dichlorohydrine monosulfurous acid ester in the crude reaction product.

5. Process according to claim 3, in which said saponifying agent is $H_2SO_4$ in the form of an aqueous solution said saponifying agent being present in amount of 0.1 equivalent for each mol of pentaerythrite chlorohydrine monosulfurous acid ester in the crude reaction product.

6. Process according to claim 3, in which said saponifying agent is NaOH in the form of an alcoholic solution said saponifying agent being present in amount of 2 equivalents for each mol of pentaerythrite dichlorohydrine monosulfurous acid ester in the crude reaction product.

7. Process according to claim 6 in which said NaOH is present in amount of about 2 equivalents for each mol of pentaerythrite dichlorohydrine monosulfurous acid ester in the crude reaction product.

8. Process according to claim 3 in which said saponifying agent is KOH in the form of an alcoholic solution said saponifying agent being present in amount of 2 equivalents for each mol of pentaerythrite dichlorohydrine monosulfurous acid ester in the crude reaction product.

9. Process according to claim 1, in which said saponifying agent is HCl in the form of an aqueous solution.

10. Process according to claim 1, in which said saponifying agent is $H_2SO_4$ in the form of an aqueous solution.

11. Process according to claim 1, in which said saponifying agent is NaOH in the form of an alcoholic solution.

12. Process according to claim 11 in which said NaOH is present in amount of at least 5 equivalents for each mol of the pentaerythrite dichlorohydrine monosulfurous acid ester and in which the conversion products recovered are cyclic ethers of pentaerythrite.

13. Process according to claim 1, in which said saponifying agent is KOH in the form of an alcoholic solution.

14. Process according to claim 13, in which said KOH is present in amount at least 5 equivalents for each mol of the pentaerythrite dichlorohydrine monosulfurous acid ester and in which the conversion products recovered are cyclic ethers of pentaerythrite.

References Cited in the file of this patent

UNITED STATES PATENTS

| | | |
|---|---|---|
| 2,441,595 | Rapoport | May 18, 1948 |
| 2,462,048 | Wyler | Feb. 15, 1949 |
| 2,495,305 | Wyler | Jan. 24, 1950 |

OTHER REFERENCES

Marrian: Chem. Reviews, vol. 43 (August, 1948), pages 156–164; 179.

Mooradian et al.: JACS 67, 942–944 (1945).

Govaert, Natuurwetensch. Tijdschr. 22, pp. 73–74 (1940).